United States Patent [19]

Wick et al.

[11] 3,998,543
[45] Dec. 21, 1976

[54] DUAL OPTICAL PROJECTION SYSTEM FOR COPYING MACHINES

[75] Inventors: Richard Wick; Jürgen Orthmann, both of Munich, Germany

[73] Assignee: Agfa-Gevaert AG, Leverkusen, Germany

[22] Filed: May 2, 1975

[21] Appl. No.: 574,094

[30] Foreign Application Priority Data

May 17, 1974 Germany .......................... 2424191

[52] U.S. Cl. .................................... 355/24; 355/8
[51] Int. Cl.² .................. G03B 27/32; G03B 27/52
[58] Field of Search ..................... 355/23, 24, 25, 8

[56] References Cited

UNITED STATES PATENTS

| | | | |
|---|---|---|---|
| 3,844,653 | 10/1974 | Kelly | 355/24 X |
| 3,844,654 | 10/1974 | Guenther | 355/24 |

Primary Examiner—Richard A. Wintercorn
Attorney, Agent, or Firm—Michael J. Striker

[57] ABSTRACT

A copying machine which can image the upper side or the underside of an original onto a photosensitive surface. The original is placed onto a copyboard or between two copyboards, and the projection system for integral imaging of the upper side or the underside of such original comprises two units one of which images the upper side and the other of which images the underside of the original. A switchover device, which may constitute a component of one of the projection units, is provided to select that side of an original which is to be imaged. Alternatively, the switchover device activates the lamps for illumination of the upper side or the underside of an original.

12 Claims, 3 Drawing Figures

DUAL OPTICAL PROJECTION SYSTEM FOR COPYING MACHINES

BACKGROUND OF THE INVENTION

The present invention relates to copying machines in general, and more particularly to improvements in optical projection systems or projecting means for copying machines.

In presently known copying machines, e.g., in xerographic copying machines, the original to be copied is placed face-down onto a transparent copyboard. This is considered necessary in order to obtain a sharp image of the original on a photosensitive surface, e.g., on the photosensitive surface at the outer side of an endless belt-like or cylindrical conductive backing memeber. Thus, when a relatively thick book or brochure is to be placed onto the copyboard, a selected page (which can be located close to the front cover, in the middle or nearer to the rear cover of the book) is supposed to lie flat against the upper side of the copyboard. Such procedure is cumbersome and time-consuming when the operator desires to make copies of sereral pages because the book must be lifted, the next page selected, and the book again placed onto the copyboard so that each of a series of selected pages abuts against the copyboard. It would be simpler and much faster, at least under certain circumstances, to reproduce successive or selected pages of a book while the information on a selected page faces upwardly because the pages could be turned upon completion of each copying operation while the book would remain on the copyboard. the reproduction of information on successive sheets of a stack of sheets would be equally convenient if the imprinted sides of the sheets could face upwardly since the next copying operation could begin as soon as the topmost sheet is removed from the stack. Moreover, the attendant would be in a position to conveniently mask selected portions of the upper side of a single sheet or of the topmost sheet of a stack of sheets on the copyboard as well as to readily shift the single sheet or the topmost sheet of a stack so that only a selected portion of such sheet would be in requisite position for imaging onto a photosensitive surface.

SUMMARY OF THE INVENTION

An object of the invention is to provide a copying machine, especially a xerographic copying machine for integral imaging of originals onto a photosensitive surface, with a novel projection system or projecting means which renders it possible to selectively image the one or the other side of an original.

Another object of the invention is to provide a copying machine which is constructed and assembled in such a way that it allows for the making of copies in rapid sequence even if the original is a book having a large number of pages each of which or several of which must be reproduced in a given sequence or at random.

A further object of the invention is to provide a copying machine wherein the optical projection system is constructed and assembled in such a way that the machine can make copies of the one and thereupon the other side of an original while the position of the original in or on the machine remains unchanged.

An additional object of the invention is to provide a projection system which is simple, compact and comprises a small number of parts and wherein the shifting from copying the upper sides to the copying of undersides of originals or vice versa can be completed within a fraction of the time which is needed for such manipulation in a conventional copying machine.

Still another object of the invention is to provide an optical projection system which can produce sharp images of both sides of an original without necessitating any manual shifting or inversion of the original.

The copying machine which embodies the invention is preferably a zerographic copying machine for integral imaging of originals and comprises light-transmitting support means (e.g., a transparent copyboard) onto which an original can be placed so that a first side thereof faces toward and a second side thereof faces away from the support means, a substantially flat image-receiving surface (such surface may be a photosensitive surface at the outer side of the flat upper reach of an endless belt-like conductive backing member), means for illuminating an original on the support means (such illuminating means may comprise one or more light sources, e.g., flash units, for each side of the original on the support means), and a projection system constituting a means for imaging onto the surface a selected side of the original on the support means. The projection system or projecting means comprises switchover means (e.g., a pivotable image mirror or means for selectively energizing the light source or sources for the first or second side of an original on the support means) which is actuatable (e.g., by a lever or the like) to select that side of an original on the support means whose image is to be projected onto the light-receiving surface. Such image is thereupon developed, either to form a powder image which is to be transferred onto and fused to a paper sheet or the like, or directly on a sheet-like carrier which is provided with the image-receiving surface.

As stated above, the illuminating means may comprise at least one first light source (e.g., two parallel tubular flash lamps) which is arranged to illuminate the first side and at least one light source (e.g., two parallel tubular flash lamps) which is arranged to illuminate the second side of an original on the support means.

The projecting means or projection system may comprise first and second projection units which respectively serve to project the image of the first and second sides of an original on the support means.

The novel features which are considered as characteristic of the invention are set forth in particular in the appended claims. The improved projection system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
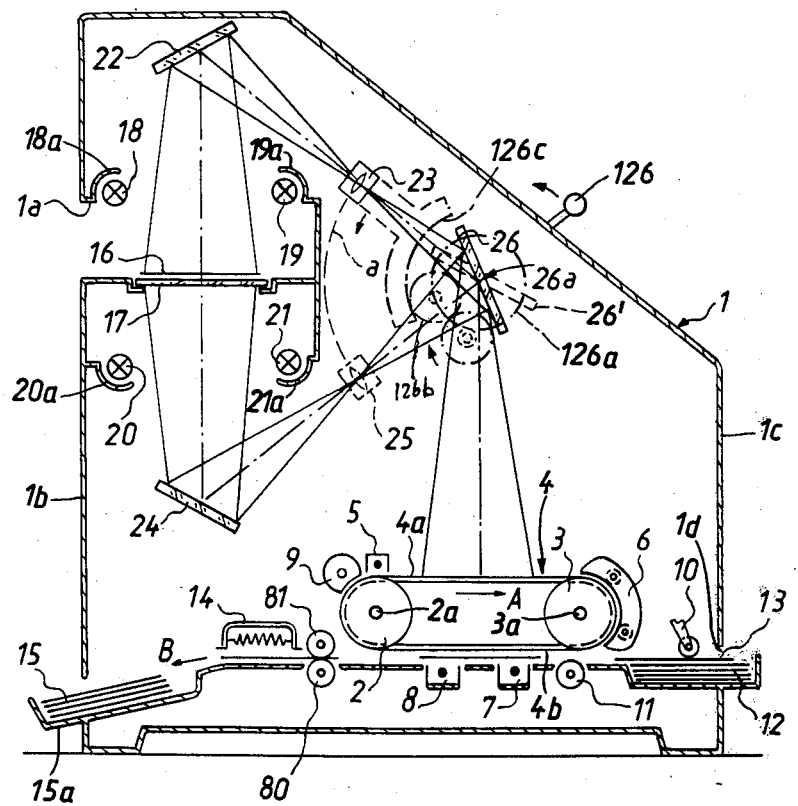
FIG. 1 is a partly schematic vertical sectional view of a copying machine having a projection system which embodies one form of the invention.

Referring first to FIG. 1, there is shown a copying machine having a housing 1 whose front wall 1b is formed with an inlet 1a for insertion of originals 16. A properly inserted original 16 rests on a light-transmitting horizontal support or copyboard 17. The upper side of the original 16 on the copyboard 17 can be illuminated by two parallel tubular light sources 18, 19 (e.g., flash lamps) mounted in front of suitable reflectors 18a, 19a. Two additional tubular light sources 20, 21, mounted in front of reflectors 20a, 21a, are installed in the housing 1 to illuminate the underside of the original 16 on the copyboard 17.

The lower portion of the housing 1 contains an endless belt-like conductive backing member 4 which is trained over pulleys 2 and 3. At least one of the shafts 2a, 3a for the pulleys 2, 3 can be driven at intervals to advance the backing member 4 (hereinafter call belt for short) in the direction indicated by arrow A. An electrostatic image of the upper or lower side of the original 16 on the copyboard 17 is projected onto the flat upper reach 4a of the belt 4 while the latter is held at a standstill. The exterior of the belt 4 has a photosensitive surface. A corona discharge device 5 is mounted in the housing 1 adjacent to the apex of the pulley 2 to charge successive increments of the belt 4 when the belt is in motion. A developing device 6 of conventional design is adjacent to the pulley 3 to convert the electrostatic image on the upper reach 4a of the belt 4 into a powder image when the belt is driven to advance in the direction indicated by arrow A. The powder image is thereupon transferred onto the uppermost sheet 13 of a stack of sheets in a try 12 which can be refilled through an opening 1d in the rear wall 1c of the housing 1. A feeding roll 10 is set in motion together with the belt 4 to advance the topmost sheet 13 into the range of a transporting roll 1 adjacent to the right-hand end of the lower reach 4b of the belt 4. The powder image is transferred by a transfer corona 7 which is followed by a removing corona 8 serving to destroy the charge of the sheet 13 so that the leader of such sheet descends and enters the nip of two advancing rolls 80, 81 which cause the sheet to pass through a fixing or fusing device 14 wherein the powder image is stablizied and the finished sheet or copy 15 thereupon descends onto the topmost sheet of a stack of finished sheets in a second try 15a which is accessible at the front side of the housing 1. The direction in which a sheet 13 advances along and at the speed of the lower reach 4b of the belt 4 is indicated by arrow B. The charging corona device 5 is preceded by a customary cleaning device 9 which removes remnants of toner particles from the photosensitive surface at the outer side of the belt 4. At least one of the pulleys 2, 3 may be biased in a direction away from the other pulley to maintain the reaches 4a, 4b of the belt 4 under requisite tension.

The optical projection system or image projecting means of the copying machine comprises two fixedly mounted object mirrors 22, 24, a pivotable image mirror 26, and at least one lens, e.g., the lens 23. When an original 16 is placed onto the copyboard 17 face up, the information at its upper side is illuminated by the light sources 18, 19 and the image of the upper side is reflected by mirror 22 into the lens 23 which projects the image onto the reflecting surface of the image mirror 26. The latter is then maintained in the solid-line position of FIG. 1 so that it can reflect the image onto the photosensitive surface on the flat upper reach 4a of the belt 4.

If an original 16 is placed onto the copyboard 17 face down, its underside is illuminated by the light sources 20, 21 and the image of such underside is relfected by the object mirror 24 into the lens 25 which projects the image onto the reflecting surface of the mirror 26 (which in then held in the broken-line position 26'). The mirror 26 reflects the image onto the photosensitive surface on the upper reach 4a of the belt 4. The lens 25 is indicated by broken lines because it is optional. If this lens is omitted, the lens 23 is movable between the solid-line position of FIG. 1 and a second position corresponding to that of the lens 25. The arcuate path along which the lens 23 can be moved (if the lens 25 is omitted) is indicated at a.

The mirror 26 is mounted on a pivot 26a which is secured to an actuating lever 126 accessible from without the housing 1. The lever 126 can move the mirror 26 between the solid-line position and the position 26' of FIG. 1 and preferably further serves to simultaneously move the lens 23 along the path a. The extent of angular movement of the lens 23 is twice the extent of angular movement of the mirror 26; therefore, the copying machine comprises a suitable transmission which insures that the angular displacement of lens 23 exceeds the angular displacement of mirror 26. For example, the actuating lever 126 may be connected with a gear 126a in a mesh with a smaller gear 126b which meshes with an arcuate internal gear segment 126c guided in a side wall of the housing 1 and supporting the lens 23. The transmission ratio of the gears 126a –126c can be readily selected in such a way that the angular displacement of lens 23 exceeds the angular displacement of mirror 26 to a desired extent. The mirror 26 not only constitutes an image mirror for the projection unit including the object mirror 22 or for the projection unit including the mirror 24 but also a selector or switchover means which is actuatable by lever 126 and can determine whether the copying machine will image the upper side or the underside of an original 16 on the copyboard 17.

It is clear that the just described transmission constitutes but one of several motion transmitting means which can move the lens 23 simultaneously with the mirror 26. It is also possible to employ a suitable linkage or use an electric motor which is started in response to pivoting of the lever 126 to move the lens 23 to the solid-line position when the lever 126 moves the mirror 26 to the solid-line position or to move the lens 23 to the other position (corresponding to that of the lens 25) when the lever 126 is pivoted to move the mirror 26 to the position 26'. It is also possible to provide discrete actuating means for moving the lens 23; however, the provision of motion transmitting means which receives motion from the lever 126 is preferred because the position of the lens 23 is changed automatically in response to each change in the position of the mirror 26. It is further possible to provide a lever or wheel which moves the lens 23 along the path a and to use a motion transmitting device to change the angular position of the mirror 26 in response to each movement of the lens 23.

Once the photosensitive surface on the upper reach 4a of the belt 4 has received an electrostatic image, the belt 4 is set in motion to move the upper reach 4a along the developing device 6 which converts the elelctrostatic image into a powder image, and such powder image is thereupon transferred onto the sheet 13 which is being advanced by the transporting roll 11 and/or rolls 80, 81. The exact construction of the developing device 6 forms no part of the invention. The outer side of the belt 4 is cleaned by the device 9, and successive increments of the belt 4 are charged by the corona device 5 so that the upper reach 4a of the belt 4 is ready to receive an electrostatic image as soon as the belt 4 is brought to a standstill subsequent to transfer of a powder image onto the respective sheet 13. The transferred image is fused in the fixing device 14, and the thus obtained copy 15 descends on top of the stack in the tray 15a from which the copies may be removed individually or in groups or stacks of two or more.

The components 22, 23, 26 together constitute a first unit and the components 24, 25, 26 or 24, 23, 26 together constitute a second unit of the projection system. It will be noted that the two units of the projection system may comprise common components (23 and/or 26) and that one of these components (mirror 26) may constitute the selector or switchover means of the projection system.

It is further within the purview of the invention to replace the lenses 23, 25 with a single lens fixedly mounted in the straight path of light rays which are reflected by the mirror 26 and travel toward the outer side of the upper reach 4a of the belt 4. The mirror 26 is then positioned (or can be positioned) in such a way that it reflects the image of the upper side or the underside of an original 16 on the copyboard 17 while remaining at a standstill. The switchover means of the projection system then comprises a device which turns on the light sources 18, 19 or 20, 21 depending upon whether the user of the machine wished to make one or more copies of the upper side or one or more copies of the underside of an original. The structure which is shown in FIG. 1 (with two discrete lenses 23, 25 or with a lens 23 which is movable along the path a) is preferred at this time because such projection system occupies less room in the housing 1.

Figure 2:
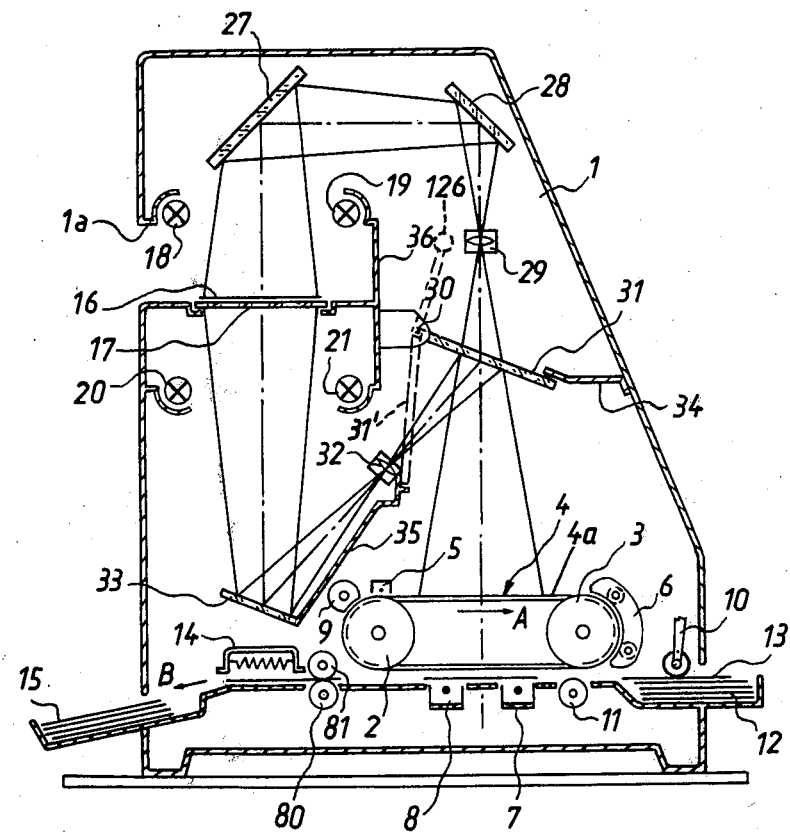
FIG. 2 is a similar sectional view of a copying machine having a second projection system.

FIG. 2 shows a second copying machine wherein all such parts which are identical with or clearly analogous to the corresponding parts of the first machine are denoted by similar reference characters. The projection system comprises two object 27, 33 which respectively correspond to the object mirrors 22, 24 of FIG. 1, a fixedly mounted image mirror 28 which cooperates with the object mirror 27 to project the image of the upper side of an original 16 on the copyboard 17 onto the photosensitive surface at the outer side of the flat uppper reach 4a of the belt 4 by way of a lens 28 fixedly mounted in the housing 1, a second fixedly mounted lens 32 which projects the image reflected by the object mirror 33, and a pivotable second image mirror 31 which can reflect the image of the underside of an original 16 on the copyboard 17 onto the upper reach 4a. The image mirror 31 is secured to a pivot 30 which can be turned by means of a lever 126. The mirror 31 blocks the image of the upper side of an original 16 when it assumes the solid-line position of FIG. 2 and is then in an optimum position to reflect the image of the underside of the original. The pivot 30 is adjacent to (i.e., located without) the path of light rays which have passed through the lens 29. When the mirror 31 is pivoted to the broken position 31', it intercepts the light rays passing through the lens 32 and enables the lens 29 to image the upper side of the original 16 on the copyboard 17 onto the photosensitive surface of the upper reach 4a. The housing 1 contains a first internal wall or partition 34 against which the mirror 31 abuts in the solid-line position and a second internal wall or partition 35 against which the mirror 31 abuts in the broken-line position 31'. A third internal wall or partition 36 prevents light issuing from the sources 18, 19 from interfering with light which issues from the sources 20, 21, or vice versa.

It is clear that the mirror 31 need not perform a purely pivotal movement but can be mounted for a more complex (e.g., pivotal and translatory) movement between the two end positions. Also, the arrangement may be such that the mirror 31 is connected or otherwise associated with a shield or baffle which intercepts light issuing from the lens 32 when the mirror 31 does not obstruct the passage of light from the lens 29 toward the upper reach 4a and which is out of the way when the mirror 31 assumes the solid-line position of FIG. 2 so that the mirror 31 prevents the imaging of the upper side of an original but cooperates with the lens 32 to project the image of the underside of the original onto the photosensitive layer of the upper reach 4a.

An advantage of the copying machine of FIG. 2 is that the switchover means or mirror 31 must be accurately located only when it assumes the solid-line position in which it extends across a straight portion of the path of light reflected by the mirror 29. The exact positioning of the mirror 31 in the position 31' is of no importance, as long as the mirror does not interfere with the imaging of the upper side of an original on the copyboard 17.

Figure 3:
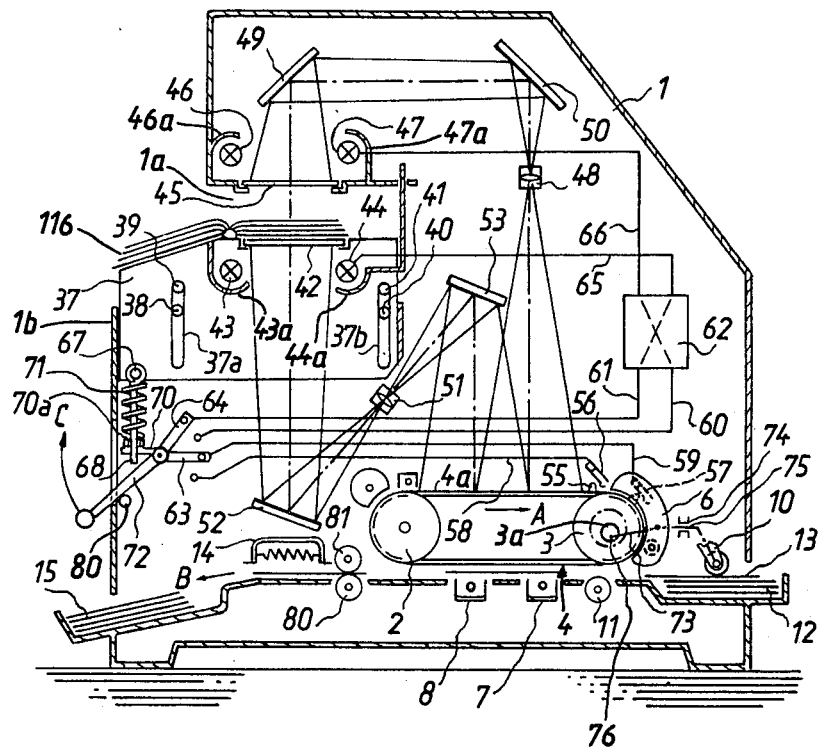
FIG. 3 is a similar sectional view of a copying machine having a third projection system.

FIG. 3 illustrates a third copying machine wherein all such parts which are identical with or clearly analogous to the corresponding parts of the first machine are denoted by similar reference characters. The housing 1 contains a fixedly mounted upper light-transmitting support or copyboard 45 and a lower light-transmitting support or copyboard 42. The latter is mounted on a reciprocable holder or carriage 37. The copyboard 45 is mounted below two tubular light sources 46, 47 which are fixedly installed in the housing 1 in front of suitable reflectors 46a, 47a and serve to illuminate the upper side of an original 116 (e.g., a book or brochure resting on the lower copyboard 42). The carriage 37 supports two tubular light sources 43, 44 cooperating with reflectors 43a, 44a to illuminate the underside of an original on the copyboard 42.

The carriage 37 has two vertical slots 37a, 37b which respectively receive portions of stationary guide pins 38, 39 and 40, 41. The pins 38–41 not only prevent stray movements of the carriage 37 but also determines its lower end position which is shown in FIG. 3.

That unit of the projection system which images the upper side of an original 116 onto the photosensitive surface of the flat upper reach 4a of the belt 4 comprises an object mirror 49 above the copyboard 45, an image mirror 50 and a lens 48. When the machine is set to reproduce the information at the upper side of an original, the carriage 37 is lifted so that the upper side of the original on the lower copyboard 42 abuts against the upper side of the fixedly mounted upper copyboard 45; this insures that the image is properly focussed on the upper reach 4a.

The other unit of the projection system (namely, the unit which images the underside of an original on the lower copyboard 42) comprises a fixedly mounted object mirror 52 below the carriage 37, a fixedly mounted lens 51, and a fixedly mounted image mirror 53. The latter is mounted without the path of light passing from the lens 48 toward the upper reach 4a when the machine is in the process of making an electrostatic image of the upper side of an original 116.

In order to make sure that the machine will be unable to make simultaneous electrostatic images of the upper side and underside of an original on the copyboard 42, the housing 1 further supports means for connecting the light sources 46, 47 to an energy source 62 when the latter is disconnected from the light sources 43, 44 or vice versa. The connecting means comprises two electric switches 56, 57 which are adjacent to the path of movement of an acutating projection or trip 55 on the belt 4. The distance between the switches 56, 57 (as considered in the direction indicated by arrow A) equals the extend to which the image of the upper side of an original 116 on the copyboard 42 is shifted with respect to the image of the underside of an original on this copyboard.

The light sources 43, 44 are connected with the energy source 62 by conductor means 65, and the light sources 46, 47 are connected with the energy source 62 by conductor means 66. Additional conductor means 60, 61 connect the energy source 62 with certain contacts of a selector switch or switchover means 63, 64, and this selector switch is further connected with the switches 56, 57 by conductor means 58, 59. The selector switch 63, 64 has two positions in one of which the switch 56 is in circuit with the energy source 62 and in the other of which the energy source 62 is in circuit with the switch 57. The light sources 43, 44 illuminate the underside of an original 116 on the copyboard 42 when the trip 55 maintains the normally open switch 57 in closed position and the switch 57 is in circuit with the energy source 62. The light sources 46, 47 illuminate the upper side of an original which is located immediately below the upper copyboard 45 when the trip 55 maintains the switch 56 in closed position and the switch 56 is in circuit with the energy source 62.

The carriage 37 carries a coupling pin 67 which is surrounded by an eye or sleeve at the upper end of a motion transmitting rod 68 the lower end portion of which is slidable in a hole provided therefor in a lug 70a forming part of a link 70. A helical spring 71 is interposed between the lug 70a and the coupling pin 67 to yieldably urge the carriage 37 upwardly (and to thereby maintain the upper side of an original 116 on the copyboard 42 in abutment with the underside of the fixedly mounted copyboard 45) when the selector switch 63, 64 is pivoted by a manually operable lever 72. This lever abuts against a stop 80 in the housing 1 when the carriage 37 dwells in the lower end position of FIG. 3 but the lever 72 is pivotable in the direction indicated by arrow C to thereby actuate the switch 63, 64 and to simultaneously raise the carriage 37 by way of the spring 71. The lever 72 may be held in the other end position by hand if the machine is to make a single copy of the upper side of an original 116, or the housing 1 may have suitable detent means which holds the lever 72 in the other end position against the opposition of the spring 71 if the user of the machine wishes to make two or more copies of the upper side of an original. The height of the linlet 1a in the front end wall 1b of the housing 1 is sufficient to allow for insertion of a relatively thick book or another original to be imaged onto the photosensitive surface of the upper reach 4a. the spring 71 insures that the upper side of the sheet which contacts the underside of the copy board 45 is invariably focussed onto the upper reach 4a with the same degree of accuracy irrespectively of the thickness of the original on the lower copyboard 42, as long as the lever 72 has been moved to the other end position. The selector switch 63, 64 then completes the circuit including the upper light sources 46, 47, the energy source 62 and the switch 56 to enable the machine to make a sharp image of the upper side of the original which abuts against the underside of the fixedly mounted copyboard 45. When the lever 73 is thereupon returned into abutment with the stop 80, the switch 63, 64 completes the circuit which includes the light sources 43, 44, the energy source 62 and the switch 57 so that the unit 52, 51, 53 of the projection system produces a satisfactory electrostatic image of that side of an original which is immediately adjacent to the upper side of the mobile copyboard 42.

The trip insures that the powder image which is obtained when the upper reach 4a is caused to move past the developing device 6 is transferred onto a predetermined portion of a sheet 13 irrespective of whether the electrostatic image on the photosensitive surface of the upper reach 4a is the image of the upper side or the image of the underside of an original 116. Such reproducible transfer of powder images onto sheets 13 is further insured due to the provision of a motion transmitting connection 73, 74, 75, 76 between the feed roll 10 for the topmost sheets 13 in the try 12 and the shaft 3a which forms part of the drive means for moving the belt 4 in the direction indicated by arrow A upon completion of the projection of an image onto the photosensitive surface of the upper reach 4a. The connection 73–76 may constitute a crank drive but is equally possible to employ a toothed rack and a suitable system of gears or any other power train which insures that the movement of the belt 4 (for the purpose of transferring a powder image) is properly synchronized with movement of the sheet 13 which is being advanced by the feed roll 10.

The copying machine of FIG. 3 need not employ a pivotable or otherwise movable mirror because the loci where the images of the upper side and underside of an original on the copyboard 42 reach the belt 4 do not coincide with each other.

The machine of FIG. 3 can employ a continuously moving belt 4 or an analogous backing member, whereby the relative position of the backing member is caused to conform to the distance between the two loci by appropriate regulation of the light sources.

An important advantage of the copying machine of FIG. 3 is that it can make copies of pages in relatively thick or relatively think books, brochures or analogous originals. Also, the turning of pages for the purpose of copying takes up much less time than in conventional machines because the operator merely lowers the carriage 37 so that the pages of a book 116 on the copyboard can be turned while the position of the book with respect to the copyboard 42 remains unchanged. The moving means 37, 71 for the lower copyboard 42 insures that the upper sides of successive originals are imaged with the same degree of sharpness irrespective of whether the copyboard is close to or distant from the copyboard 45, as long as the side to be copied abuts against the underside of the copyboard 45.

Each of the described copying machines exhibits the advantage that a sheet which bears information at each of its sides can be copied from both sides while it lies on the copyboard 17 or 42 (in the latter instance, the copyboard 42 is raised so that the upper side of such sheet abuts against the copyboard 45).

It is clear that the invention can be embodied in other types of copying machines, for example, in machines for direct electrophotography (such as zinc oxide copying machines) or in other copying machines which do not produce an intermediate positive or negative image. All that is necessary to replace the illustrated projection units having even numbers of mirrors with projection units having odd numbers of mirrors.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

We claim:

1. In a copying machine, particularly in a xerographic copying machine for integral imaging of originals, a combination comprising light-transmitting support means onto which an original can be placed so that a first side thereof faces toward and a second side thereof faces away from said support means; a substantially flat image-receiving surface; means for illuminating an original on said support means comprising at least one first light source arranged to illuminate said first side and at least one second light source arranged to illuminate said second side of the original on said support means; projection means for imaging onto said surface a selected side of the original on said support means, said projection means comprising switchover means actuatable to select that side of the original on said support means whose image is to be projected onto said surface, first and second projection units for respectively projecting the image of said first and said second side of the original on said support means, said projection units comprising a common image mirror which constitutes said switchover means; means for moving said mirror to a first position in which said mirror reflects onto said surface the image of the first side of the original on said support means and a second position in which said mirror reflects onto said surface the image of the second side of the original on said support means; and lens means for respectively imaging onto said mirror the first and second sides of an original on said support means when said mirror is respectively maintained in said first and second positions.

2. A combination as defined in claim 1 wherein said lens means comprises discrete first and second lenses respectively constituting components of said first and second units.

3. A combination as defined in claim 1, wherein said lens means comprises a single lens and further comprising means for moving said single lens with said mirror so that said single lens images onto said mirror the first side of an original on said support means when said mirror is held in said first position and that said singel lens images onto said mirror the second side of an original on said support means when said mirror is held in said second position thereof.

4. In a copying machine, particularly in a xerographic copying machine for integral imaging of originals, a combination comprising light-transmitting support means onto which an original can be placed so that a first side thereof faces toward and a second side thereof faces away from said support means; a substantially flat image-receiving surface; means for illuminating an original on said support means said illuminating means comprising at least one first light source arranged to illuminate said first side and at least one second light source arranged to illuminate said second side of the original on said support means; projection means for imaging onto said surface a selected side of the original on said support means, said projection means comprising switchover means actuatable to select that side of the original on said support means whose image is to be projected onto said surface, said projection means comprising first and second projection units for respectively projecting the image of said first and said second side of the original on said support means, one of said units comprising a mirror which constitutes said switchover means and is movable to and from an operative position in which said mirror reflects onto said surface the image of the respective side of an original on said support means and blocks the projection of images by the other of said units; and means for moving said mirror to an inoperative position in which said other unit is free to project onto said surface the image of the respective side of an original on said support means.

5. A combination as defined in claim 4, wherein each of said units comprises an object mirror, a lens and an image mirror, said switchover means constitutes the image mirror of said one unit.

6. In a copying machine, particularly in a xerographic copying machine for integral imaging of originals, a combination comprising light-transmitting support means onto which an original can be placed so that a first side thereof faces toward and a second side thereof faces away from said support means; a substantially flat image-receiving surface; means for illuminating an original on said support means and comprising at least one first light source arranged to illuminate said first side and at least one second light source arranged to illuminate said second side of the original on said support means; and projection means for imaging onto said surface a selected side of the original on said support means, said projection means comprising switchover means actuatable to select that side of the original on said support means whose image is to be projected onto said surface, comprises first and second projection units for respectively projecting the image of said first and said second side of the original on said support means along separate first and second paths, said switchover means comprising a device for selectively energizing said first and second light sources.

7. A combination as defined in claim 6, wherein said surface is movable transversely of said paths between a first position in which a predetermined portion thereof is located in said first path and a second position in which said predetermined portion thereof is located in said second path.

8. A combination as defined in claim 7, further comprising means for respectively locating said surface in said first and second positions when said device respectively energizes said first and second light sources.

9. A combination as defined in claim 6, wherein each of said light sources comprises a flash unit.

10. In a copying machine, particularly in a xerographic copying machine for integral imaging of originals, a combination comprising light-transmitting support means onto which an original can be placed so that a first side thereof faces toward and a second side thereof faces away from said support means said support means comprising a first copyboard and a second copyboard, the originals being insertable between said copyboards so that said first and second sides of a thus inserted original respectively face said first and second copyboards and said first side abuts against said first copyboard a substantially flat image-receiving surface; means for illuminating a original on said support means comprising at least one first light source arranged to illuminate said first side and at least one second light source arranged to illuminate said second side of the original on said support means; projection means for imaging onto said surface a selected side of the original on said support means, said projection means comprising switch-over means actuatable to select that side of the original on said support means whose image is to be projected onto said surface, and first and second projection units for respectively projecting the image of said first and said second side of the original on said support means; and means for moving said first copyboard from a first position in which said first unit is ready to image said first side onto said surface to a second position in which said second side of the original abuts against said second copyboard and said second unit is ready to image said second side onto said surface.

11. A combination as defined in claim 10, wherein said means for moving said first copyboard comprises means for yieldably biasing said second side of the original against said second copyboard in said second position of said first copyboard.

12. A combination as defined in claim 11, further comprising means for actuating said switchover means and means for transmitting motion to said moving means in response to actuation of said switchover means.

* * * * *